(12) United States Patent
Horn et al.

(10) Patent No.: US 11,770,217 B2
(45) Date of Patent: Sep. 26, 2023

(54) TECHNIQUES FOR USING A NON-LINEAR MODEL TO INDICATE DATA IN WIRELESS COMMUNICATIONS

(71) Applicant: QUALCOMM Incorporated, San Diego, CA (US)

(72) Inventors: Idan Michael Horn, Hod Hasharon (IL); Assaf Touboul, Netanya (IL); Shay Landis, Hod Hasharon (IL); Gideon Shlomo Kutz, Ramat Hasharon (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 17/351,484

(22) Filed: Jun. 18, 2021

(65) Prior Publication Data

US 2022/0407627 A1    Dec. 22, 2022

(51) Int. Cl.
| | |
|---|---|
| *H04L 1/18* | (2023.01) |
| *H04L 5/00* | (2006.01) |
| *H04W 72/12* | (2023.01) |
| *H04L 1/1812* | (2023.01) |
| *H04W 72/1268* | (2023.01) |

(52) U.S. Cl.
CPC .......... *H04L 1/1812* (2013.01); *H04L 5/0055* (2013.01); *H04W 72/1268* (2013.01)

(58) Field of Classification Search
CPC ... H04W 28/04; H04W 72/04; H04W 72/042; H04W 88/08; H04W 71/11; H04W 72/115; H04W 72/40; H04W 72/1268; H04L 5/0007; H04L 1/1812; H04L 5/0055

USPC .......................................................... 370/329
See application file for complete search history.

(56) References Cited

U.S. PATENT DOCUMENTS

| | | | | |
|---|---|---|---|---|
| 8,326,239 | B1 * | 12/2012 | Peiris | H04B 1/0475 455/115.2 |
| 9,935,810 | B1 * | 4/2018 | Hammier | H03F 1/3247 |
| 2005/0018755 | A1 * | 1/2005 | Chae | H04B 1/707 375/267 |
| 2005/0020313 | A1 * | 1/2005 | Chae | H04B 7/0634 455/562.1 |
| 2011/0074506 | A1 * | 3/2011 | Kleider | H03F 1/3294 330/149 |
| 2011/0075745 | A1 * | 3/2011 | Kleider | H04L 25/03057 375/260 |
| 2012/0113831 | A1 * | 5/2012 | Pelletier | H04L 5/0053 370/252 |

(Continued)

FOREIGN PATENT DOCUMENTS

WO    WO 2022/240730 A1 * 11/2022    ............... H04B 1/62

*Primary Examiner* — Peter G Solinsky
*Assistant Examiner* — Sanjay K Dewan
(74) *Attorney, Agent, or Firm* — Arent Fox, LLP

(57) ABSTRACT

Aspects described herein relate to converting, by applying a non-linear function, a symbol indicating first data into an analog signal for transmitting to a network node, wherein applying the non-linear function indicates second data, separate from first data, and transmitting the analog signal to the network node. Additional aspects relate to receiving an analog signal from a user equipment (UE), and estimating a non-linear function applied to the analog signal in converting a symbol indicating first data into the analog signal, wherein estimating the non-linear function indicates second data, separate from first data.

30 Claims, 7 Drawing Sheets

(56) References Cited

U.S. PATENT DOCUMENTS

| | | | |
|---|---|---|---|
| 2015/0103952 A1* | 4/2015 | Wang | H04B 1/0475 |
| | | | 375/297 |
| 2017/0033809 A1* | 2/2017 | Liu | H04B 1/04 |
| 2017/0047952 A1* | 2/2017 | Kim | H04B 1/0475 |
| 2018/0263030 A1* | 9/2018 | Kim | H04L 1/1812 |
| 2019/0150181 A1* | 5/2019 | Kim | H04L 1/1812 |
| | | | 370/329 |
| 2020/0281011 A1* | 9/2020 | Xiong | H04L 1/1812 |

* cited by examiner

TECHNIQUES FOR USING A NON-LINEAR MODEL TO INDICATE DATA IN WIRELESS COMMUNICATIONS

BACKGROUND

Aspects of the present disclosure relate generally to wireless communication systems, and more particularly, to transmitting or receiving reference signals in wireless communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors communicatively coupled with the memory and the transceiver. The one or more processors are configured to execute the instructions to cause the apparatus to convert, by applying a non-linear function, a symbol indicating first data into an analog signal for transmission to a network node, wherein applying the non-linear function to the symbol adds an indication of second data, separate from the first data, in the analog signal, and transmit the analog signal to the network node.

In another aspect, an apparatus for wireless communication is provided that includes a transceiver, a memory configured to store instructions, and one or more processors communicatively coupled with the memory and the transceiver. The one or more processors are configured to execute the instructions to cause the apparatus to receive an analog signal from a user equipment (UE), and estimate a non-linear function applied to the analog signal in converting a symbol indicating first data into the analog signal, wherein estimating the non-linear function provides an indication of second data, separate from first data.

In another aspect, a method for wireless communication at a UE is provided that includes converting, by applying a non-linear function, a symbol indicating first data into an analog signal for transmission to a network node, wherein applying the non-linear function to the symbol adds an indication of second data, separate from the first data, in the analog signal, and transmitting the analog signal to the network node.

In another aspect, a method for wireless communication at a network node is provided that includes receiving an analog signal from a UE, and estimating a non-linear function applied to the analog signal in converting a symbol indicating first data into the analog signal, wherein estimating the non-linear function provides an indication of second data, separate from first data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
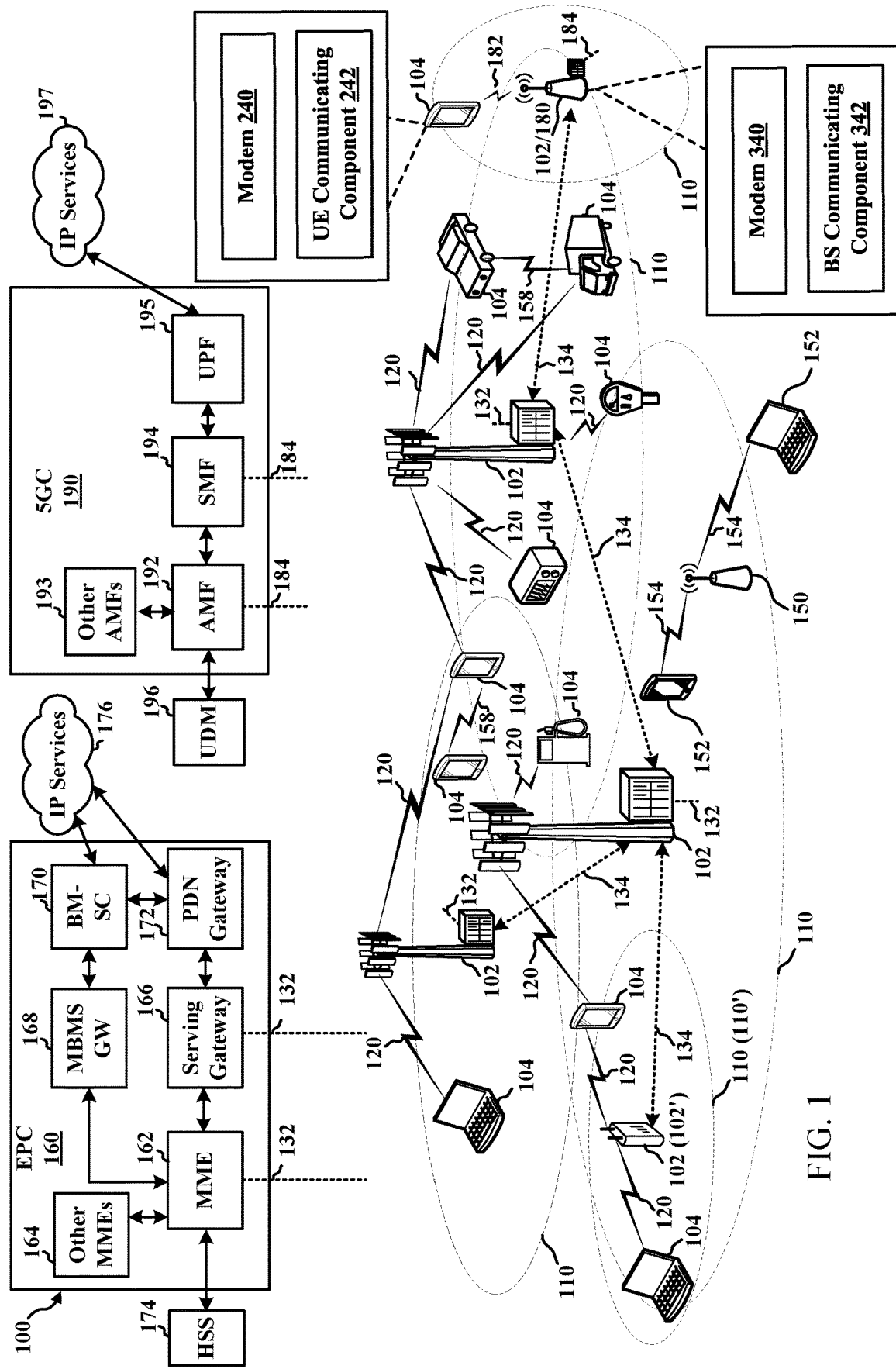
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to using a non-linear function or model (e.g., for modulation), which can also be referred to as "kernels," to indicate data in wireless communications. In wireless communication technologies such as fifth generation (5G) new radio (NR), as frequency range increases and/or latency in communications decrease, overhead associated with the communications may increase. As such, mechanisms to more efficiently communicate overhead information, such as using non-linear modulation to communicate the overhead information, may be used.

In millimeter wave (mmWave) and moving forward to sub-terrahertz (THz) frequency range communications, a number of antennas in user equipment (UE) and/or in the base station (e.g., gNB) increase to enable the larger frequency range, which may enable an efficient beamforming with desirable beam spatial separation. In addition, sub-THz efficient implementations (e.g., using butler matrix) can enable functionality with multiple simultaneous downlink beams (e.g., using space division multiplexing (SDM)) where each beam may have its own associated uplink feedback. The feedback may include hybrid automatic repeat/request (HARQ) acknowledgement (ACK)/negative-ACK (NACK) feedback. As the number of beams, a number of code block groups (CBGs), etc., increases, the uplink overhead associated with HARQ feedback linearly increases with the number of streams (e.g., per slot HARQ feedback can be the number of beams multiplied by the number of CBGs).

Aspects described herein relate to signaling data, such as HARQ feedback, by modulating different non-linearity models. For example, a UE can signal first information, such as HARQ feedback, by using the different non-linearity models in transmitting other communications. In this example, a gNB, or other receiving device, can estimate which model is used and can accordingly determine the transmitted first information, such as the HARQ feedback, and/or can demodulate the other communications as well. In the HARQ feedback example, using this mechanism can allow for transmission of additional HARQ ACK/NACK bits, where a number of the additional bits can correspond to a number of transmissions in a time period (e.g., a number of symbols in a slot). In an example, this can increase available HARQ ACK/NACK bits, such to accommodate additional HARQ feedback demands described above. In one example, the non-linearity model can correspond to a non-linearity power amplifier (PA) model where different PAs, or different combinations of PAs or related power amplification parameters, can be used in generating signals for uplink transmission, where selection of the PA model can be used to indicate other uplink information, such as HARQ ACK/NACK bits for previously received downlink communications.

In this regard, for example, the other uplink information can be communicated without significant (or any) additional overhead. This can improve throughput of wireless communications by allowing communication of additional information without additional overhead. In addition, this can enable transmission of important control information, such as HARQ ACK/NACK feedback, without requiring separate control information channel resources, etc. Improving throughput of wireless communications can improve latency and user experience in using UEs in a wireless network.

The described features will be presented in more detail below with reference to FIGS. 1-7.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for using a non-linear model in generating signals where the non-linear model can be used to indicate data, in accordance with aspects described herein. In addition, some nodes may have a modem 340 and BS communicating component 342 for estimating a non-linear model used in generating signals where the non-linear model used can indicate data, in accordance with aspects described herein. Though a UE 104 is shown as having the modem 240 and UE communicating component 242 and a base station 102/gNB 180 is shown as having the modem 340 and BS communicating component 342, this is one illustrative example, and substantially any node or type of node may include a modem 240 and UE communicating component 242 and/or a modem 340 and BS communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an 51 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages.

The base stations 102 may communicate directly or indirectly (e.g., through the EPC 160 or 5GC 190) with each other over backhaul links 134 (e.g., using an X2 interface). The backhaul links 134 may be wired or wireless. The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, UE communicating component 242 can use a non-linear model in generating signals for transmission, where the non-linear model used can indicate additional data that is separate from data indicated in the signal itself (e.g., separate from data indicated by the modulated symbols of the signal). In one example, UE communicating component 242 can apply multiple PAs using a different model to indicate the additional data. For example, UE communicating component 242 can apply a first PA or associated coefficients to indicate a first value for the additional data, or can apply a second PA or associated coefficients to indicate a second value for the additional data, or can apply a combination of PAs or associated coefficients to indicate different values for the additional data, etc. In this example, BS communicating component 342 can receive an analog signal from the UE 104, and can estimate the non-linear model used to generate the signal (e.g., can estimate which PA or combination of PAs or related coefficients are applied to the signal) to determine the additional data.

Figure 2:
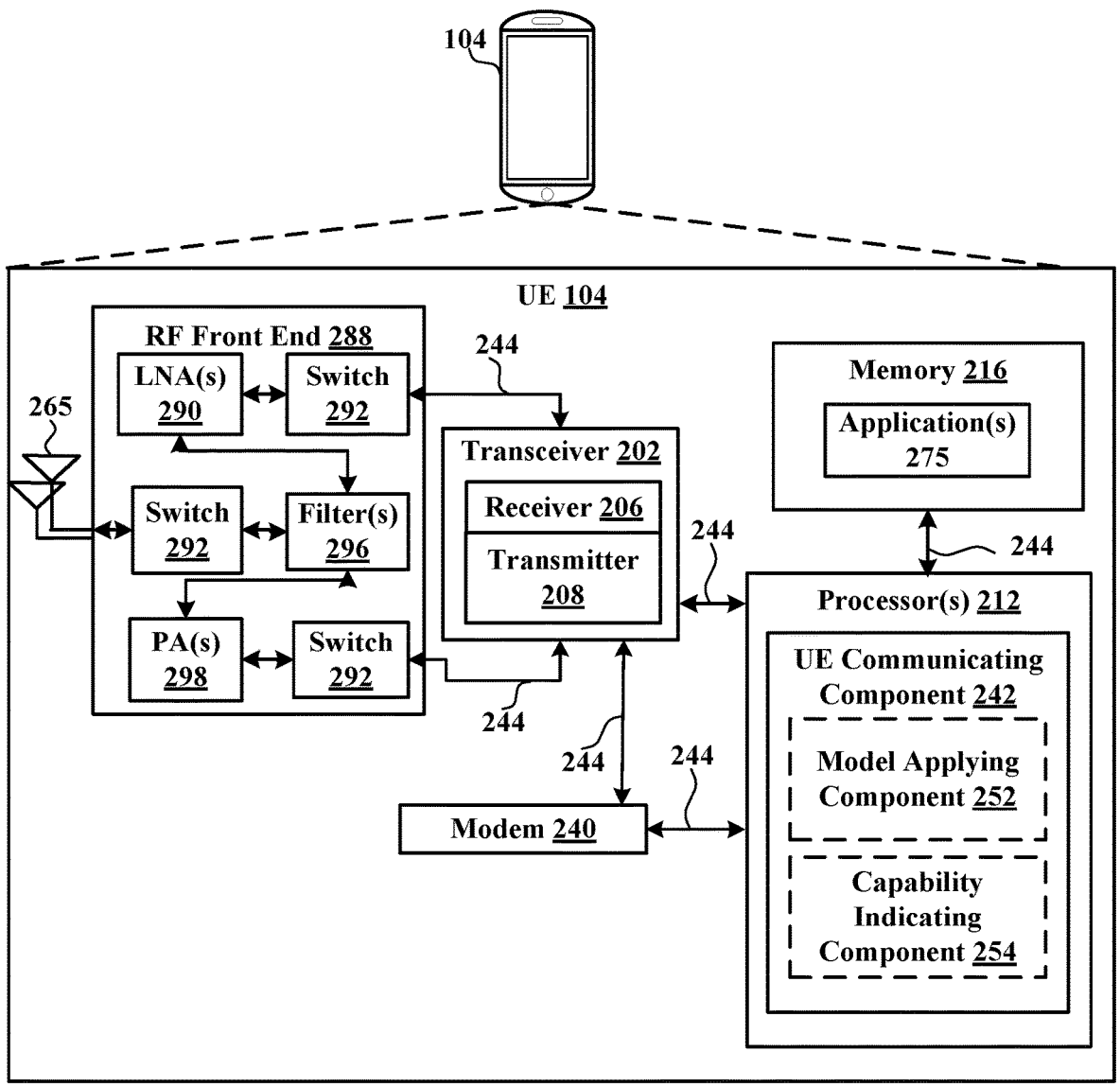
FIG. 2 is a block diagram illustrating an example of a UE, in accordance with various aspects of the present disclosure.
Figure 3:
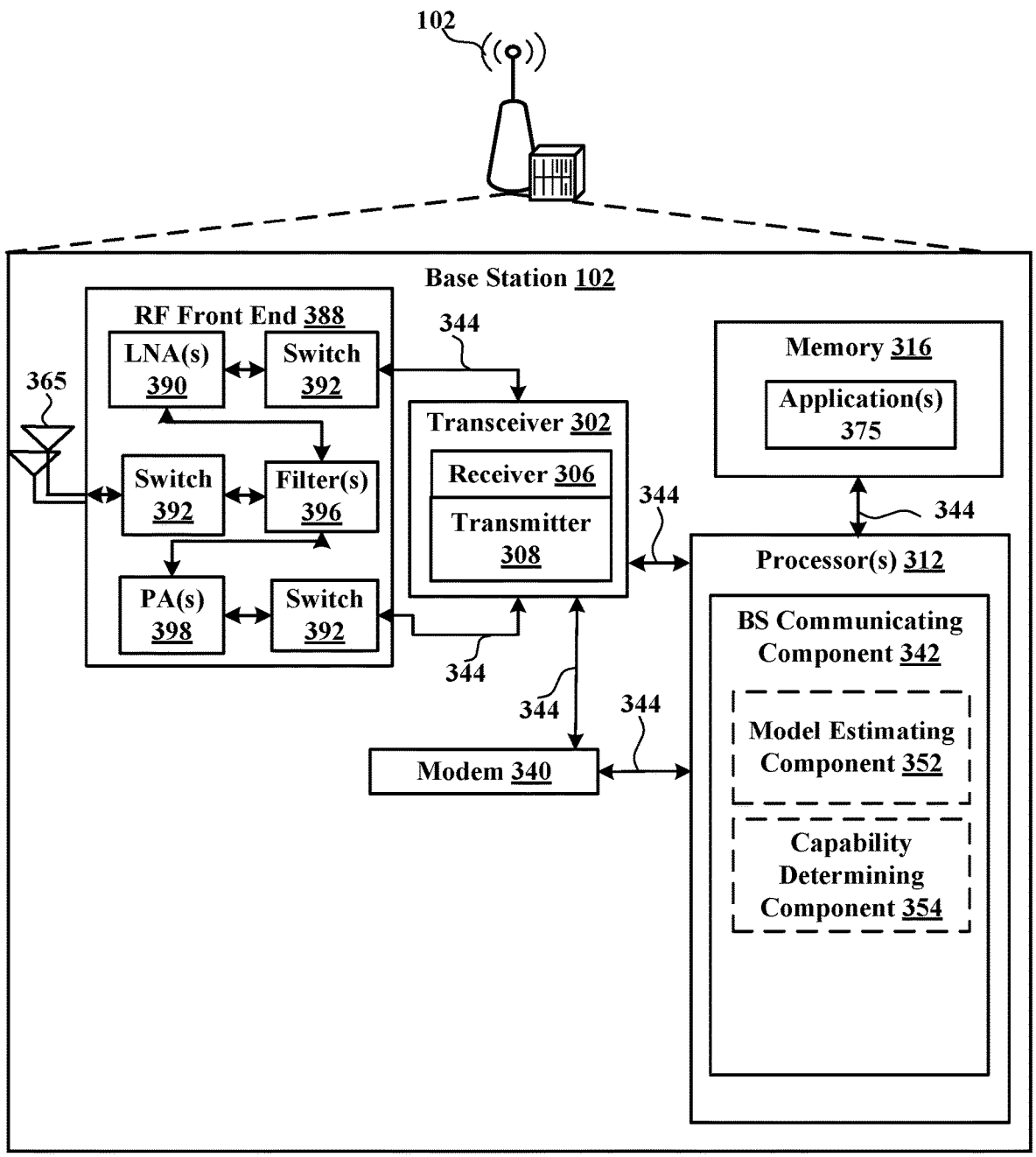
FIG. 3 is a block diagram illustrating an example of a base station, in accordance with various aspects of the present disclosure.
Figure 4:
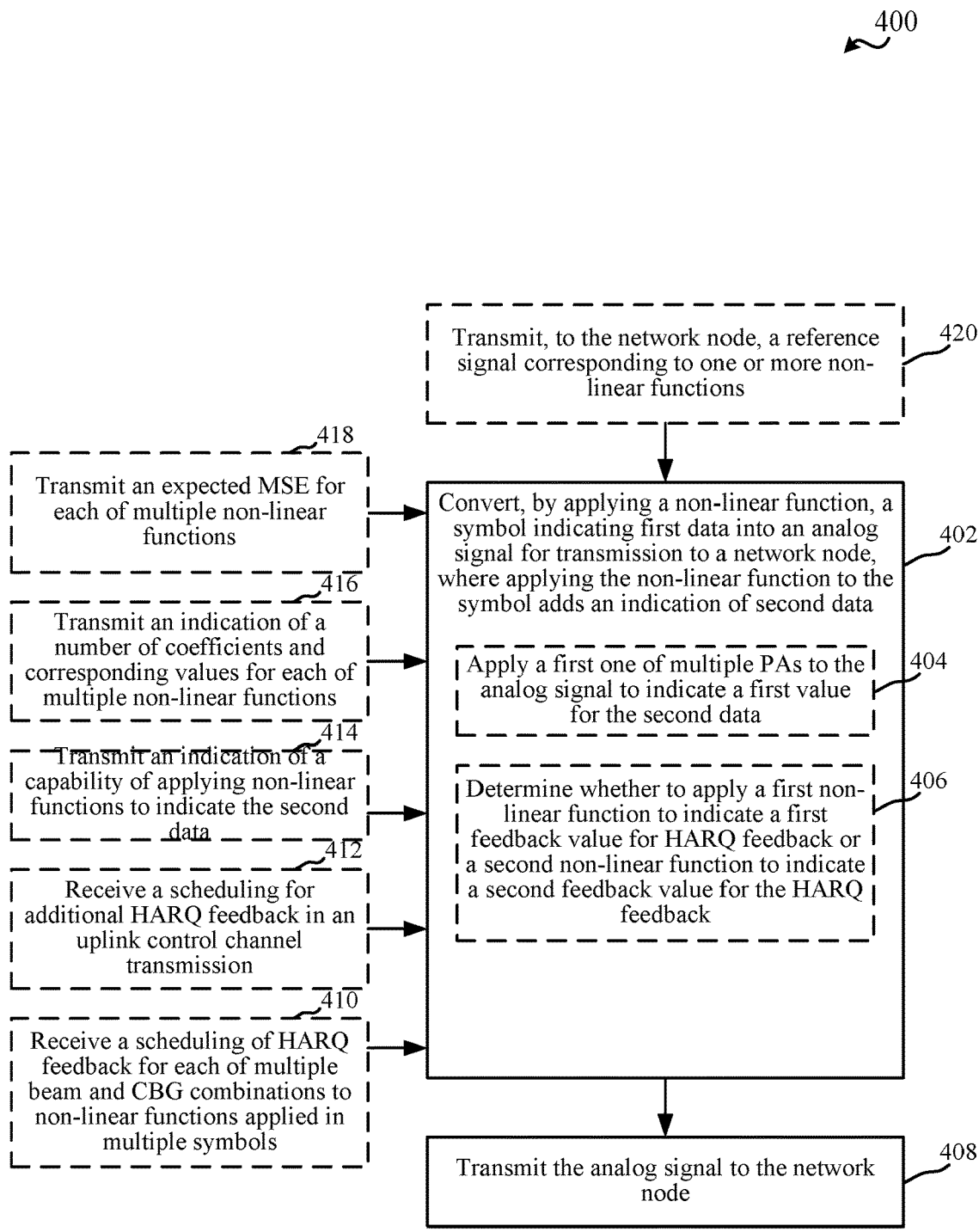
FIG. 4 is a flow chart illustrating an example of a method for applying a non-linear function in transmitting a symbol to indicate data, in accordance with aspects described herein.
Figure 5:
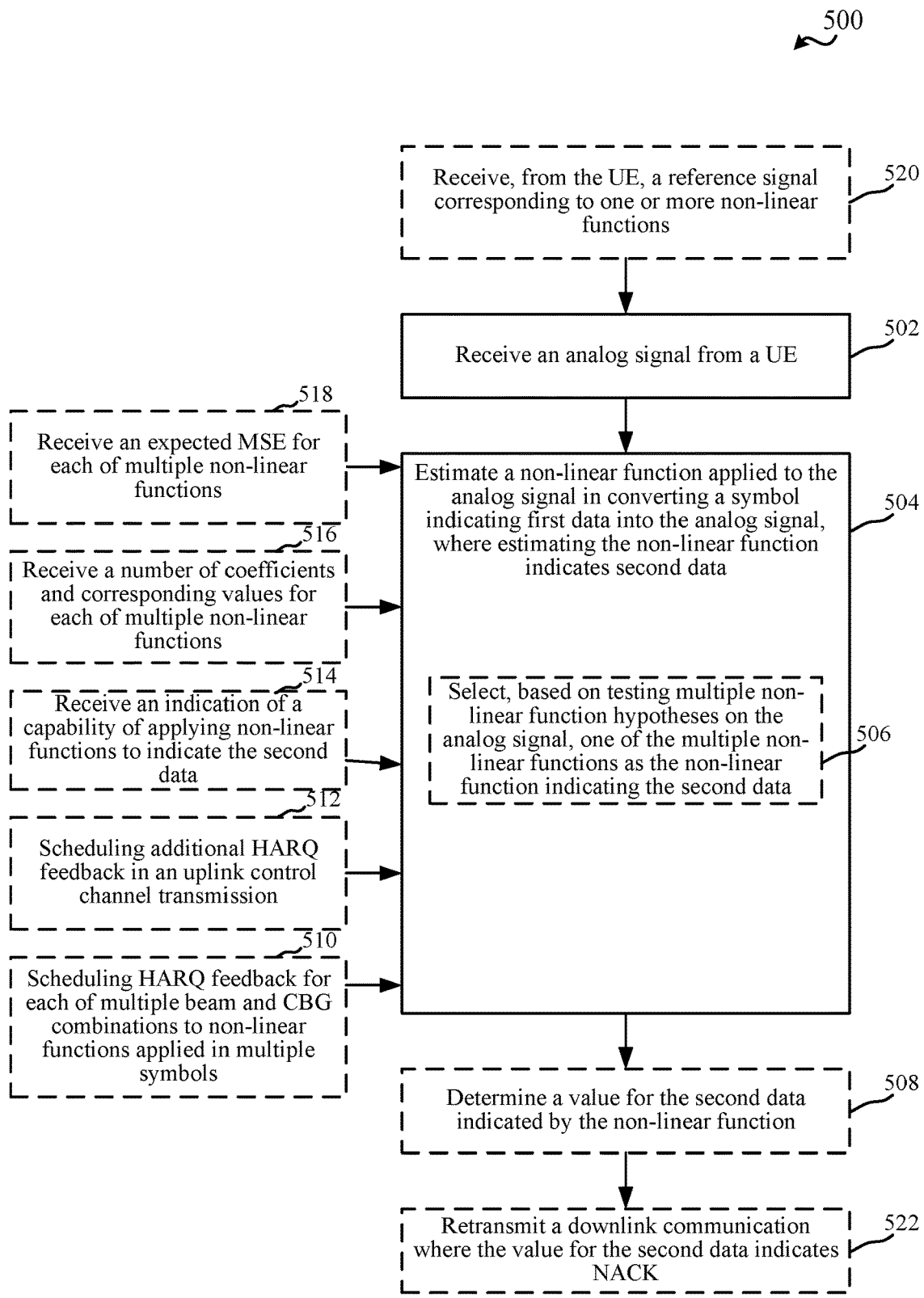
FIG. 5 is a flow chart illustrating an example of a method for determining data indicated by a non-linear function applied to a received symbol, in accordance with aspects described herein.

Turning now to FIGS. 2-7, aspects are depicted with reference to one or more components and one or more methods that may perform the actions or operations described herein, where aspects in dashed line may be optional. Although the operations described below in FIGS. 4 and 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for using a non-linear model in generating signals where the non-linear model can be used to indicate data, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a model applying component 252 for applying a model in generating a signal to indicate additional data, and/or a capability indicating component 254 for indicating a capability to use multiple non-linear models to indicate additional data in generating signals, in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and BS communicating component 342 for estimating a non-linear model used in generating signals where the non-linear model used can indicate data, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, BS communicating component 342 can optionally include a model estimating component 352 for estimating a model used in generating a received signal to determine additional data indicated by the model selection, and/or a capability determining component 354 for determining a capability of a UE to use multiple non-linear models in generating signals to indicate additional data, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for using a non-linear function to generate a signal for transmission where the non-linear function can indicate additional data, in accordance with aspects described herein. In an example, a UE 104 (or base station 102 or other device) can perform the functions described in method 400 using one or more of the components described in FIGS. 1 and 2.

In method 400, at Block 402, a symbol indicating first data can be converted, by applying a non-linear function, into an analog signal for transmission to a network node, where applying the non-linear function to the symbol adds an indication of second data. In an aspect, model applying component 252, e.g., in conjunction with processor(s) 212, memory 216, transceiver 202, UE communicating component 242, etc., can convert, by applying the non-linear function, the symbol indicating the first data into the analog signal for transmission to the network node, where applying the non-linear function to the symbol adds an indication of second data. For example, the second data can be of a certain data type, such as HARQ feedback or other feedback or control data. In an example, model applying component 252 can apply a first non-linear function to indicate a first value of the data type for the second data (e.g., ACK), a second non-linear function to indicate a second value of the data type for the second data (e.g., NACK), etc. In an example, model applying component 252 can apply the non-linear function for each of one or more symbols in a slot. Where the non-linear function can indicate a bit per symbol, for example, model applying component 252 can apply the linear function to indicate up to Xbits of information, where X can be the number of symbols in the slot.

In one example, in applying the non-linear function at Block 402, optionally at Block 404, a first one of multiple PAs can be applied to the analog signal to indicate a first value for the second data. In an aspect, model applying component 252, e.g., in conjunction with processor(s) 212, memory 216, transceiver 202, UE communicating component 242, etc., can apply the first one of the multiple PAs to the analog signal to indicate the first value for the second data. Moreover, for example, model applying component 252 can apply a second one of the multiple PAs to another analog signal for another symbol to indicate a second value for the second data, etc., as described above and further herein. In yet another example, model applying component 252 can apply the multiple PAs using different coefficients or other parameters, according to the non-linear function, to indicate a first or second value (or other values) for the second data. A specific example of using PAs in this regard is shown in FIG. 6.

Figure 6:
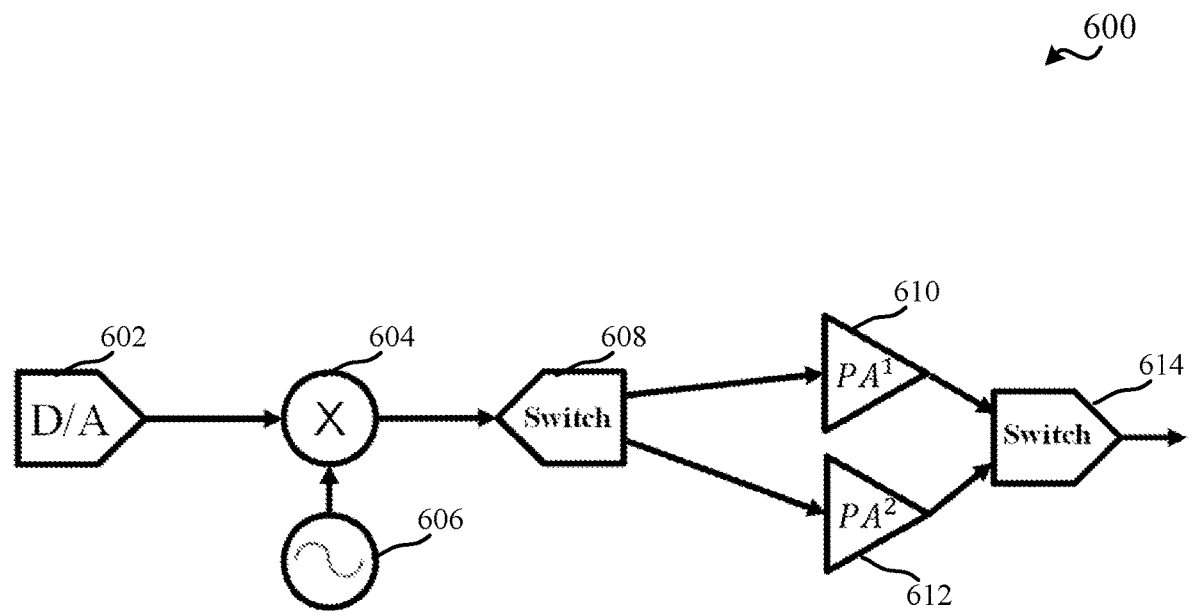
FIG. 6 illustrates an example of multiple power amplifiers used to achieve the non-linearity functions, in accordance with aspects described herein.

FIG. 6 illustrates an example of a portion of RF components 600 of a wireless communication device, such as a UE 104. RF components 600 can include a digital to analog converter (D/A) 602, a modulator 604 to modulate the analog signal based on a waveform 606, a switch 608 to select between PAs 610, 612 for applying power amplification to the analog signal, and/or a switch 614 to select or combine output from PAs 610, 612 for transmitting the analog signal with a power amplification. For example, model applying component 252 can use switch 608 to select between PAs 610, 612 for indicating the second data. As described, for example, PA 610 can be selected for applying power amplification to the analog signal to indicate a first value for the second data, or PA 612 can be selected for applying power amplification to the analog signal to indicate a second value for the second data. In other examples, a function applied to both PAs 610, 612 can be used to indicate one or more values for the second data (e.g., different coefficients or weights can be applied to the PAs 610, 612 to be used in combination to indicate a corresponding value for the second data).

For example, PA non-linearity can be modeled by a linear combination of non-linear functions, which may also be referred to as kernels. This can be similar to digital post distortion (DPOD) were the receiving device (e.g., a gNB) can find a most optimal or probable linear combination (e.g., coefficients) of the UE PA kernels. In the case of DPOD, the receiving device (e.g., a gNB) can compensate in an optimal way for the UE PA non-linearity. According to aspects described herein, the receiving device (e.g., a gNB) can estimate which non-linearity model was used and by that decide if the second data is indicated (e.g., which can include determining if ACK\NACK was transmitted in some examples described herein). The number of kernels can maintain high PA model precision (which can be defined by the wireless communication technology, such as 5G NR standards, and/or may be transmitted or configured by a gNB during connection establishment). In some examples, model applying component 252 can apply non-linear functions in other components of the UE 104 to indicate the second data, such as by adding digital non-linearity (e.g., during digital-to-analog conversion by D/A 602).

In one example, in applying the non-linear function at Block 402, optionally at Block 406, it can be determined whether to apply a first non-linear function to indicate a first feedback value for HARQ feedback or a second non-linear function to indicate a second feedback value for the HARQ feedback. In an aspect, model applying component 252, e.g., in conjunction with processor(s) 212, memory 216, transceiver 202, UE communicating component 242, etc., can determine whether to apply a first non-linear function to indicate a first feedback value for HARQ feedback or a second non-linear function to indicate a second feedback value for the HARQ feedback. For example, where the second data is a HARQ type of data, model applying component 252 can determine a value for the HARQ data (e.g., ACK or NACK) and can apply a first non-linear function to the symbol to indicate ACK or a second non-linear function to the symbols to indicate NACK. As described above and further herein, the HARQ feedback can be indicated as feedback for a previous signal (e.g., a beam and CBG combination) received in a previous symbol and/or a previous slot, such to indicate whether the previous signal was successfully received.

In method 400, at Block 408, the analog signal can be transmitted to the network node. In an aspect, UE communicating component 242, e.g., in conjunction with processor(s) 212, memory 216, transceiver 202, etc., can transmit the analog signal to the network node. For example, UE communicating component 242 can transmit the analog signal with the non-linear function applied using additional RF components and one or more antennas. In an example, UE communicating component 242 can transmit the analog signal based on time and/or frequency resources scheduled (e.g., by the base station 102 or other device) for transmitting uplink channel communications (e.g., PUSCH, PUCCH, etc. communications) to the base station 102, sidelink communications to another device, etc. In any case, a receiving device can estimate the non-linear function used in transmitting the analog signal, and can accordingly determine the second data, in addition to the first data indicated in the symbol itself, etc., as described further herein.

In method 400, optionally at Block 410, a scheduling of HARQ feedback for each of multiple beam and CBG combinations to non-linear functions applied in multiple symbols can be received. In an aspect, model applying component 252, e.g., in conjunction with processor(s) 212, memory 216, transceiver 202, UE communicating component 242, etc., can receive the scheduling of HARQ feedback for each of the multiple beam and CBG combinations to non-linear functions applied in multiple symbols. For example, the UE 104 can be configured (e.g., by the base station 102) with the scheduling, which can specify which symbols or corresponding resources for uplink transmission should have non-linear functions applied to indicate HARQ feedback for previously received communications (e.g., downlink communications received by the UE 104 from the base station 102, sidelink communications received by the UE 104 from another UE, etc. in a given beam and CBG combination). For example, the configuration may indicate to apply a non-linear function to an uplink transmission over a certain symbol in a slot to indicate HARQ feedback for a downlink communication received in a previous beam and CBG combination (or other indication of resources) of a previous slot.

In an example, the scheduling can identify at least the symbol for indicating HARQ feedback for a first beam and code block group in a first previous symbol in a previous slot by applying the non-linear function and a second symbol for indicating HARQ feedback for a second beam and code block group in a second previous symbol in the previous slot by applying the non-linear function. For example, the HARQ feedback can indicate whether a signal in a previous beam and CBG combination is successfully received. In any case, for example, model applying component 252 can accordingly apply the non-linear function to the appropriate symbol to indicate a determined HARQ feedback value or other data.

In method 400, optionally at Block 412, a scheduling for additional HARQ feedback in an uplink control channel transmission can be received. In an aspect, UE communicating component 242, e.g., in conjunction with processor(s) 212, memory 216, transceiver 202, etc., can receive the scheduling for additional HARQ feedback in an uplink control channel transmission, such as PUCCH. In this regard, for example, the UE 104 can indicate HARQ feedback both by model applying component 252 applying a non-linear function to one or more uplink transmissions to indicate additional HARQ feedback and in the uplink control channel transmission (e.g., in PUCCH) by modulating a symbol to indicate the feedback. In one example, model applying component 252 can apply the non-linear function to the uplink control channel transmission to indicate HARQ feedback in the uplink control channel transmission symbol and also by the non-linear function applied to the uplink control channel transmission. In any case, additionally using the non-linear function can expand the HARQ feedback reporting capabilities of the UE 104 to various combinations of beams, CBGs, and/or other time and/or frequency resources within a slot. In an example, base station 102 can schedule or configure, to the UE 104, and the UE 104 can receive the scheduling of, the HARQ feedback to use the non-linear function in downlink control signaling, one or more radio resource control (RRC) parameters, and/or the like.

In method 400, optionally at Block 414, an indication of a capability of applying-nonlinear functions to indicate the second data can be transmitted. In an aspect, capability indicating component 254, e.g., in conjunction with processor(s) 212, memory 216, transceiver 202, UE communicating component 242, etc., can transmit (e.g., to the base station 102) the indication of the capability of applying the non-linear functions to indicate second data. In this regard, a receiving device, such as a base station 102, can determine, based on the capability, to schedule or otherwise indicate which symbols should have the non-linear function applied to indicate the additional data (e.g., HARQ feedback) for which previously received symbols (and/or beam and CBG combinations). For example, capability indicating component 254 can transmit an indication of the capability to the base station 102 in RRC signaling at connection establishment, which may be based on a request from the base station 102 or otherwise.

In method 400, optionally at Block 416, an indication of a number of coefficients and corresponding values for each of multiple non-linear functions can be transmitted. In an aspect, capability indicating component 254, e.g., in conjunction with processor(s) 212, memory 216, transceiver 202, UE communicating component 242, etc., can transmit (e.g., to the base station 102) the indication of the number of coefficients and corresponding values for each of multiple non-linear functions. In one example, capability indicating component 254 can transmit the indication as part of the capability indicator transmitted at Block 414, or in other RRC signaling or other signaling to the base station 102 or other receiving device. For example, the information regarding the coefficients and corresponding values for the second data can assist the receiving in determining a value for second data indicated by the applying of the non-linear function at Block 402. For example, the information may relate to coefficients used in each non-linear function to indicate the second data. In this example, the receiving device can estimate the non-linear function and/or related coefficients of a received signal, and can determine the value for the second data based on the received information (e.g., by determining which value for the second data has indicated coefficients that most closely correspond to the estimated coefficients). The coefficients and corresponding values can be used in applying each of the multiple power amplifiers to use each of the multiple non-linear functions.

In method 400, optionally at Block 418, an expected means-squared error (MSE) for each of the multiple non-linear functions can be transmitted. In an aspect, capability indicating component 254, e.g., in conjunction with processor(s) 212, memory 216, transceiver 202, UE communicating component 242, etc., can transmit (e.g., to the base station 102) the expected MSE for each of the multiple non-linear functions. For example, the expected MSE can be a property of the PAs (or mixture of weighted PAs based on coefficients) used in the non-linear functions. In this example, the receiving device can determine the non-linear function and/or corresponding MSE of a received signal, and can determine the value for the second data based on the received information (e.g., by determining which value for the second data has indicated MSE that most closely corresponds to the determined MSE).

For example, capability indicating component 254 may indicate a distance between the non-linear functions, associated PA coefficients, or other kernel properties, which can be calculated by a norm 2 (absolute of square between the kernels difference). This can assist the receiving device in understanding an expected error in choosing between the non-linear functions, associated PA coefficients, or other kernel properties. The non-linear functions, associated PA coefficients, or other kernel properties can be selected so that the distance can be at least a threshold difference to allow distinguishing between the non-linear functions, associated PA coefficients, or other kernel properties.

In method 400, optionally at Block 420, a reference signal corresponding to one or more non-linear functions can be transmitted to the network node. In an aspect, capability indicating component 254, e.g., in conjunction with processor(s) 212, memory 216, transceiver 202, UE communicating component 242, etc., can transmit, to the network node (e.g., base station 102), the reference signal corresponding to the one or more non-linear functions. For example, capability indicating component 254 can transmit one or more reference signals based on applying the one or more non-linear functions to the reference signal. This can allow the receiving device to determine the MSE associated with the one or more non-linear functions for associating a determined MSE of a separately received signal with the one or more non-linear functions to determine a value for second data, as described. For example, the base station 102 can request the UE 104 to transmit the reference signal in scheduled resources to allow the base station 102 to determine or update (e.g., fine-tune) the MSE associated with one or more non-linear functions for improved detection in subsequent signals received from the UE 104. For example, the reference signal may include a sounding reference signal (SRS) or other reference signal transmitted by the UE 104.

FIG. 5 illustrates a flow chart of an example of a method 500 for estimating a non-linear function applied to a symbol to indicate additional data, in accordance with aspects described herein. In an example, a base station 102 (or UE or other receiving device) can perform the functions described in method 500 using one or more of the components described in FIG. 1 or 3.

In method 500, at Block 502, an analog signal can be received from a UE. In an aspect, BS communicating component 342, e.g., in conjunction with processor(s) 312, memory 316, transceiver 302, etc., can receive the analog signal from the UE (e.g., UE 104). For example, BS communicating component 342 can receive the analog signal over uplink resources scheduled for the UE, which can include PUCCH resources, PUSCH resources, etc. In this regard, the analog signal may include one or more modulated symbols representative of PUCCH or PUSCH data. The analog signal may also have a non-linear function applied, as described above, to indicate additional data.

In method 500, at Block 504, a non-linear function applied to the analog signal in converting a symbol indicating first data into the analog signal can be estimated, where estimating the non-linear function can indicate second data. In an aspect, model estimating component 352, e.g., in conjunction with processor(s) 312, memory 316, transceiver 302, BS communicating component 342, etc., can estimate the non-linear function applied to the analog signal in converting the symbol indicating first data into the analog signal, where estimating the non-linear function indicates second data. For example, the analog signal can indicate the first data in a modulated symbol, such as PUCCH or PUSCH data within the signal. The analog signal can also indicate the second data based on a non-linear function used in generating or otherwise in transmitting the analog signal. For example, a PA or combination of PAs can be used by the transmitting device to indicate the second data. In other examples, the transmitting device can introduce other non-linear functions (e.g., in digital-to-analog conversion). In either case, for example, model estimating component 352 can estimate the non-linear function used for the analog signal to determine a value for the second data associated with the non-linear function.

In estimating the non-linear function at Block 504, optionally at Block 506, based on testing multiple non-linear function hypotheses on the analog signal, one of the multiple non-linear functions can be selected as the non-linear function indicating the second data. In an aspect, model estimating component 352, e.g., in conjunction with processor(s) 312, memory 316, transceiver 302, BS communicating component 342, etc., can select, based on testing multiple non-linear function hypotheses on the analog signal, one of the multiple non-linear functions as the non-linear function indicating the second data. For example, model estimating component 342 can determine properties of the analog signal that correspond to the non-linear function hypotheses, such as an MSE, and can accordingly estimate the non-linear function used for the analog signal. Based on the determined properties (e.g., MSE), model estimating component 352 can determine the value for the second data (e.g., can determine ACK or NACK for HARQ feedback). In another example, model estimating component 342 can test coefficients that can be used with the non-linear function to estimate which coefficients most closely match the received analog signal (e.g., with the smallest error or deviation). Based on the determined coefficients, model estimating component 352 can determine the value for the second data (e.g., can determine ACK or NACK for HARQ feedback).

In another example, such as where the non-linear function is used in a digital-to-analog conversion to indicate the second data, model estimating component 352 can perform analog-to-digital conversion of the analog signal using different hypotheses for the non-linear function. In this example, model estimating component 352 can determine which hypothesis for non-linear function results in the most coherent (e.g., smallest error) for the conversion. Based on the determined non-linear function, model estimating component 352 can determine the value for the second data (e.g., can determine ACK or NACK for HARQ feedback).

In method 500, optionally at Block 508, a value for the second data can be determined as indicated by the non-linear function. In an aspect, model estimating component 352, e.g., in conjunction with processor(s) 312, memory 316, transceiver 302, BS communicating component 342, etc., can determine the value for the second data indicated by the non-linear function. As described in various examples above and further herein, the base station 102 can determine, configure, or be configured with a list of multiple non-linear functions or corresponding parameter values and associated values for the second data. Thus, based on determining or estimating which non-linear function is applied to the analog signal, model estimating component 352 can map the non-linear function or related parameter values to the list to determine the corresponding value for the second data. In one specific example, model estimating component 352 can determine a first PA was applied to the analog signal, which can indicate a first value for the second data (e.g., ACK for HARQ feedback) or that a second PA was applied to the analog signal, which can indicate a second value for the second data (e.g., NACK for HARQ feedback). In another example, model estimating component 352 can estimate parameter values used in applying the PAs to the analog signal, such as a coefficient applied to each of the first PA and the second PA, and can accordingly determine a value for the second data.

In method 500, optionally at Block 510, HARQ feedback for each of multiple beam and CBG combinations can be scheduled to non-linear functions applied in multiple symbols. In an aspect, model estimating component 352, e.g., in conjunction with processor(s) 312, memory 316, transceiver 302, BS communicating component 342, etc., can schedule the HARQ feedback for each of the multiple beam and CBG combinations to non-linear functions applied in multiple symbols. For example, model estimating component 352 can map each of multiple beam and CBG combinations for signals transmitted by the base station 102 (or other device) to the UE 104 in pervious symbols to HARQ feedback that can be represented by applying a non-linear function to a subsequent uplink transmission, as described above.

In method 500, optionally at Block 512, additional HARQ feedback can be scheduled in an uplink control channel transmission. In an aspect, BS communicating component 352, e.g., in conjunction with processor(s) 312, memory 316, transceiver 302, etc., can schedule the additional HARQ feedback in the uplink control channel transmission (e.g., PUCCH). Thus, for example, the base station 102 can schedule both HARQ feedback in symbols using the non-linear function applied to the signal and/or additional HARQ feedback over a control channel (e.g., PUCCH). In one example, base station 102 can schedule both in the same symbol, such that a symbol can include a PUCCH and a non-linear function applied to the signal to indicate two instances of HARQ feedback. In any case, scheduling HARQ feedback using the non-linear function application described herein can allow for at least X additional bits of HARQ feedback per slot, where X can be the number of symbols in the slot. In an example, base station 102 can schedule or configure the HARQ feedback to use the non-linear function in downlink control signaling, one or more RRC parameters, and/or the like.

In method 500, optionally at Block 514, an indication of a capability of applying non-linear functions to indicate the second data can be received. In an aspect, capability determining component 354, e.g., in conjunction with processor(s) 312, memory 316, transceiver 302, BS communicating component 342, etc., can receive (e.g., from UE 104) the indication of the capability of applying the non-linear functions to indicate second data. In this regard, model estimating component 352, and/or BS communicating component 342, can determine, based on the capability, to schedule or otherwise indicate which symbols should have the non-linear function applied to indicate the additional data (e.g., HARQ feedback) for which previously received symbols (and/or beam and CBG combinations). For example, capability determining component 354 can receive an indication of the capability in RRC signaling at connection establishment, which may be based on a request from the base station 102 or otherwise.

In method 500, optionally at Block 516, an indication of a number of coefficients and corresponding values for each of multiple non-linear functions can be received. In an aspect, capability determining component 354, e.g., in conjunction with processor(s) 312, memory 316, transceiver 302, BS communicating component 342, etc., can receive (e.g., from the UE 104) the indication of the number of coefficients and corresponding values for each of multiple non-linear functions. In one example, capability determining component 354 can receive the indication as part of the capability indicator received at Block 514, or in other RRC signaling or other signaling from the UE 104. For example, the information regarding the coefficients and corresponding values for the second data can assist the receiving in determining a value for second data by estimating the non-linear function or related parameters at Block 504. For example, the information may relate to coefficients used in each non-linear function to indicate the second data. In this example, model estimating component 352 can estimate the non-linear function and/or related coefficients of a received signal, and can determine the value for the second data based on the received information (e.g., by determining which value for the second data has indicated coefficients that most closely correspond to the estimated coefficients).

In method 500, optionally at Block 518, an expected means-squared error (MSE) for each of the multiple non-linear functions can be received. In an aspect, capability determining component 354, e.g., in conjunction with processor(s) 312, memory 316, transceiver 302, BS communicating component 342, etc., can receive (e.g., from the UE 104) the expected MSE for each of the multiple non-linear functions. For example, the expected MSE can be a property of the PAs (or mixture of weighted PAs based on coefficients) used in the non-linear functions. In this example, model estimating component 352 can determine the non-linear function based at least in part on testing the non-linear functions on the signal and determining which non-linear function hypothesis yields the lowest MSE. In one example, as described, capability determining component 354 may receive a distance between the non-linear functions, associated PA coefficients, or other kernel properties, which can be calculated by a norm 2 (absolute of square between the kernels difference). This can assist model estimating component 352 in understanding an expected error in choosing between the non-linear functions, associated PA coefficients, or other kernel properties.

In method 500, optionally at Block 520, a reference signal corresponding to one or more non-linear functions can be received from the UE. In an aspect, capability determining component 354, e.g., in conjunction with processor(s) 312, memory 316, transceiver 302, BS communicating component 342, etc., can receive, from the UE (e.g., UE 104), the reference signal corresponding to the one or more non-linear functions. For example, the UE 104 can transmit one or more reference signals based on applying the one or more non-linear functions to the reference signal. In this example, model estimating component 352 can determine the non-linear PA models (e.g., kernels) and/or or compute the corresponding MSE of the reference signal, and can determine the MSE to be associated with the one or more non-linear functions for subsequently determining values for the second data indicated by MSE of subsequent signals from the UE 104, as described. In one example, model estimating component 352 can request the UE 104 to transmit the reference signal in scheduled resources to allow the base station 102 to determine or update (e.g., fine-tune) the MSE associated with one or more non-linear functions for improved detection in subsequent signals received from the UE 104. For example, the reference signal may include a SRS or other reference signal transmitted by the UE 104.

In method 500, optionally at Block 522, a downlink communication can be retransmitted where the value for the second data indicates NACK. In an aspect, BS communicating component 342, e.g., in conjunction with processor(s) 312, memory 316, transceiver 302, etc., can retransmit the downlink communication where the value for the second data indicates NACK. For example, where model estimating component 352 determines that a non-linear function applied to a received analog signal indicates NACK feedback for a certain downlink communication previously transmitted symbol, beam and CBG combination, etc., BS communicating component 342 can retransmit the downlink communication on the previously transmitted symbol, beam and CBG combination, etc. Moreover, though aspects of method 500 are described in terms of a base station 102, the concepts can be similarly applied to other devices transmitting to UE 104, such as another UE in sidelink communication with UE 104, etc.

In examples described herein, at connection establishment, UE 104, e.g., via capability indicating component 254, can report its capability of transmitting multiple non-linearity models for HARQ modulation and the corresponding number of nonlinearity models. For example, UE 104, e.g., via capability indicating component 254, can transmit the number of coefficients and/or their corresponding values per non-linear model (or this can be defined in the wireless communication technology standard, such as 5G NR). A gNB (e.g., base station 102) can schedule, e.g., via model estimating component 352, the HARQ feedback for each CBG/beam to each non-linearity transmission. For example, the gNB can schedule this jointly with existing HARQ feedback in case higher payload is desired. The UE 104 can report the expected MSE per nonlinearity model (or this can be defined in the wireless communication technology standard, such as 5G NR). The gNB can signal the UE 104 to transmit uplink SRS per PA model for coefficients fine tuning optimization.

In examples described herein, in connection mode, for each uplink allocation, UE 104 can modulate the PA model per OFDM symbol (or can combine for multiple OFDM symbols to increase processing gain) while transmitting the uplink data. The gNB can estimate the any uplink reference signal (such as DMRS) or by testing non-linearity hypothesis on the data (in case switching is done per OFDM symbol between 2 PAs). In one example, where there are 14 symbols in a slot, the number of possible hypotheses for non-linear functions applied to the signal can be $2^{14}=16,384$ can be the number of possible hypotheses. The gNB can decrease the amount of hypotheses by hard slicing on the number of hypotheses and calculating the soft error rate (SER) per hypothesis, which can yield total of 2*14=28 hypotheses. As described, for example, the concepts described herein can be applied for substantially any type of additional data, not just ACK\NACK transmission.

Figure 7:
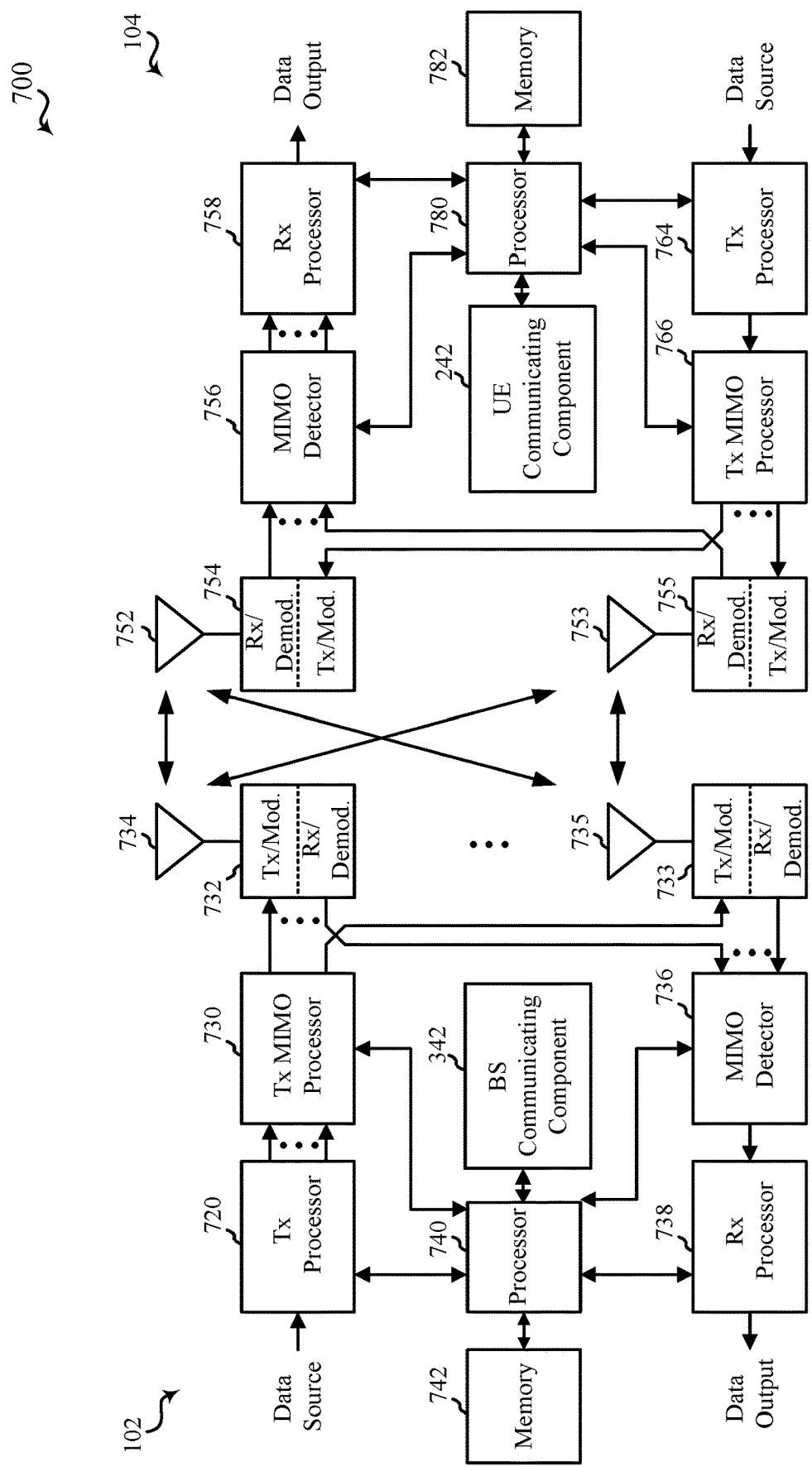
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a UE communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a BS communicating component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is an apparatus for wireless communication including a transceiver, a memory configured to store instructions, and one or more processors communicatively coupled with the memory and the transceiver, where the one or more processors are configured to execute the instructions to cause the apparatus to convert, by applying a non-linear function, a symbol indicating first data into an analog signal for transmission to a network node, where applying the non-linear function to the symbol adds an indication of second data, separate from the first data, in the analog signal, and transmit the analog signal to the network node.

In Aspect 2, the apparatus of Aspect 1 includes where the second data includes HARQ feedback.

In Aspect 3, the apparatus of Aspect 2 includes where the one or more processors are further configured to execute the instructions to cause the apparatus to determine whether to apply a first non-linear function to the symbol to indicate a first feedback value for the HARQ feedback or a second non-linear function to indicate a second feedback value for the HARQ feedback, where the first non-linear function is different than the second non-linear function, and the first feedback value is different than the second feedback value.

In Aspect 4, the apparatus of any of Aspects 2 or 3 includes where the HARQ feedback includes an ACK or a NACK indicating whether or not a signal received in a certain beam and code block group in a previous slot is successfully received.

In Aspect 5, the apparatus of any of Aspects 2 to 4 includes where the one or more processors are further configured to execute the instructions to cause the apparatus to receive a scheduling of the HARQ feedback that identifies at least the symbol for indicating HARQ feedback for a first beam and code block group in a first previous symbol in a previous slot by applying the non-linear function and a second symbol for indicating HARQ feedback for a second beam and code block group in a second previous symbol in the previous slot by applying the non-linear function.

In Aspect 6, the apparatus of Aspect 5 includes where the one or more processors are further configured to execute the instructions to cause the apparatus to receive a scheduling for additional HARQ feedback in an uplink control channel transmission.

In Aspect 7, the apparatus of any of Aspects 1 to 6 includes where the second data is of a data type, where the one or more processors are configured to execute the instructions to cause the apparatus to apply the non-linear function at least in part by applying one or more of multiple power amplifiers to the analog signal to indicate a first value of the data type for the second data, and where the one or more processors are configured to execute the instructions to cause the apparatus to apply a different non-linear function to a different symbol for generating a different analog signal at least in part by differently applying the one or more of the multiple power amplifiers to the different analog signal to indicate a second value of the data type.

In Aspect 8, the apparatus of any of Aspects 1 to 7 includes where the second data is of a data type, where the one or more processors are configured to execute the instructions to cause the apparatus to apply non-linear function at least in part by applying a first one of multiple power amplifiers to the analog signal to indicate a first value of the data type for the second data, and where the one or more processors are configured to execute the instructions to cause the apparatus to apply a different non-linear function to a different symbol for generating a different analog signal at least in part by applying a second one of the multiple power amplifiers to the different analog signal indicate a second value of the data type.

In Aspect 9, the apparatus of any of Aspects 1 to 8 includes where the second data is of a data type, where the one or more processors are further configured to execute the instructions to cause the apparatus to convert one or more additional symbols based on applying the non-linear function to indicate additional data of the data type.

In Aspect 10, the apparatus of any of Aspects 1 to 9 includes where the one or more processors are further configured to execute the instructions to cause the apparatus to transmit, to a network node, an indication of a capability of the UE to apply one or more non-linear functions, where the one or more processors are configured to execute the instructions to cause the apparatus to convert the symbol by applying the non-linear function associated with transmitting the indication of the capability.

In Aspect 11, the apparatus of Aspect 10 includes where the indication of the capability includes an indication of a number of non-linear functions supported by the UE.

In Aspect 12, the apparatus of any of Aspects 1 to 11 includes where the non-linear function is one of multiple non-linear functions of applying multiple power amplifiers, where the one or more processors are further configured to execute the instructions to cause the apparatus to transmit, to the network node, a number of coefficients and corresponding values to be used in applying each of the multiple power amplifiers to use each of the multiple non-linear functions.

In Aspect 13, the apparatus of any of Aspects 1 to 12 includes where the one or more processors are further configured to execute the instructions to cause the apparatus to transmit, to the network node, an expected MSE for each of multiple non-linear functions including the non-linear function.

In Aspect 14, the apparatus of any of Aspects 1 to 13 includes where the one or more processors are further configured to execute the instructions to cause the apparatus to transmit, to the network node and prior to transmitting the analog signal, a reference signal corresponding to one or more non-linear functions including the non-linear function.

In Aspect 15, the apparatus of Aspect 14 includes where transmitting the reference signal is based on a request received from the network node.

Aspect 16 is an apparatus for wireless communication including a transceiver, a memory configured to store instructions, and one or more processors communicatively coupled with the memory and the transceiver, where the one or more processors are configured to execute the instructions to cause the apparatus to receive an analog signal from a UE, and estimate a non-linear function applied to the analog signal in converting a symbol indicating first data into the analog signal, where estimating the non-linear function provides an indication of second data, separate from first data.

In Aspect 17, the apparatus of Aspect 16 includes where the one or more processors are configured to execute the instructions to cause the apparatus to estimate the non-linear function at least in part by selecting, based on testing multiple non-linear function hypotheses on the analog signal, one of the multiple non-linear functions as the non-linear function for indicating the second data.

In Aspect 18, the apparatus of Aspect 17 includes where the one or more processors are further configured to execute the instructions to cause the apparatus to hard slice a number of the multiple hypotheses and calculating a signal-to-error ratio per hypothesis, where the one or more processors are configured to execute the instructions to cause the apparatus to select the one of the multiple non-linear functions is based on the signal-to-error ratio.

In Aspect 19, the apparatus of any of Aspects 16 to 18 includes where the second data includes HARQ feedback includes where the one or more processors are configured to execute the instructions to cause the apparatus to estimate the non-linear function to indicate a first feedback value for the HARQ feedback, and where the one or more processors are further configured to execute the instructions to cause the apparatus to retransmit a downlink communication where the first feedback value is NACK.

In Aspect 20, the apparatus of Aspect 19 includes where the one or more processors are configured to execute the instructions to cause the apparatus to transmit estimate a different non-linear function to indicate a second feedback value for the HARQ feedback.

In Aspect 21, the apparatus of any of Aspects 19 or 20 includes where the HARQ feedback includes an ACK or a NACK indicating whether or not a signal received in a certain beam and code block group for the downlink communication in a previous slot is successfully received.

In Aspect 22, the apparatus of any of Aspects 19 to 21 includes where the one or more processors are further configured to execute the instructions to cause the apparatus to schedule the HARQ feedback that identifies at least the symbol for indicating HARQ feedback for a first beam and code block group in a first previous symbol in a previous slot by applying the non-linear function and a second symbol for indicating HARQ feedback for a second beam and code block group in a second previous symbol in the previous slot by applying the non-linear function.

In Aspect 23, the apparatus of Aspect 22 includes where the one or more processors are further configured to execute the instructions to cause the apparatus to schedule additional HARQ feedback in an uplink control channel transmission.

In Aspect 24, the apparatus of any of Aspects 16 to 23 includes where the second data is of a data type, where the one or more processors are further configured to execute the instructions to cause the apparatus to estimate the non-linear function for one or more additional analog signals to indicate additional data of the data type.

In Aspect 25, the apparatus of any of Aspects 16 to 24 includes where the one or more processors are further configured to execute the instructions to cause the apparatus to receive, from the UE, an indication of a capability of the UE to apply one or more non-linear functions, where the one or more processors are configured to execute the instructions to cause the apparatus to estimate the non-linear function as associated with the indication of the capability.

In Aspect 26, the apparatus of Aspect 25 includes where the indication of the capability includes an indication of a number of non-linear functions supported by the UE.

In Aspect 27, the apparatus of any of Aspects 16 to 26 includes where the non-linear function is one of multiple non-linear functions of applying multiple power amplifiers, where the one or more processors are further configured to execute the instructions to cause the apparatus to receive, from the UE, a number of coefficients and corresponding values to be used in applying each of the multiple power amplifiers to use each of the multiple non-linear functions.

In Aspect 28, the apparatus of any of Aspects 16 to 27 includes where the one or more processors are further configured to execute the instructions to cause the apparatus to receive, from the UE, an expected MSE for each of multiple non-linear functions including the non-linear function, where the one or more processors are configured to execute the instructions to cause the apparatus to estimate the non-linear function as associated with the expected MSE.

In Aspect 29, the apparatus of any of Aspects 16 to 28 includes where the one or more processors are further configured to execute the instructions to cause the apparatus to receive, from the UE and prior to receiving the analog signal, a reference signal corresponding to one or more non-linear functions including the non-linear function, where the one or more processors are configured to execute the instructions to cause the apparatus to estimate the non-linear function as associated with a MSE of the reference signal.

In Aspect 30, the apparatus of Aspect 29 includes where the one or more processors are configured to execute the instructions to cause the apparatus to receive the reference signal based on a request transmitted by the network node.

Aspect 31 is a method for wireless communication at a UE including converting, by applying a non-linear function, a symbol indicating first data into an analog signal for transmission to a network node, where applying the non-linear function to the symbol adds an indication of second data, separate from the first data, in the analog signal, and transmitting the analog signal to the network node.

In Aspect 32, the method of Aspect 31 includes where the second data includes HARQ feedback.

In Aspect 33, the method of Aspect 32 includes determining whether to apply a first non-linear function to the symbol to indicate a first feedback value for the HARQ feedback or a second non-linear function to indicate a second feedback value for the HARQ feedback, where the first non-linear function is different than the second non-linear function, and the first feedback value is different than the second feedback value.

In Aspect 34, the method of any of Aspects 32 or 33 includes where the HARQ feedback includes an ACK or a NACK indicating whether or not a signal received in a certain beam and code block group in a previous slot is successfully received.

In Aspect 35, the method of any of Aspects 32 to 34 includes receiving a scheduling of the HARQ feedback that identifies at least the symbol for indicating HARQ feedback for a first beam and code block group in a first previous symbol in a previous slot by applying the non-linear function and a second symbol for indicating HARQ feedback for a second beam and code block group in a second previous symbol in the previous slot by applying the non-linear function.

In Aspect 36, the method of Aspect 35 includes receiving a scheduling for additional HARQ feedback in an uplink control channel transmission.

In Aspect 37, the method of any of Aspects 31 to 36 includes where the second data is of a data type, where applying the non-linear function includes applying one or more of multiple power amplifiers to the analog signal to indicate a first value of the data type for the second data, and where applying a different non-linear function to a different symbol for generating a different analog signal includes differently applying the one or more of the multiple power amplifiers to the different analog signal to indicate a second value of the data type.

In Aspect 38, the method of any of Aspects 31 to 37 includes where the second data is of a data type, where the applying non-linear function includes applying a first one of multiple power amplifiers to the analog signal to indicate a first value of the data type for the second data, and where applying a different non-linear function to a different symbol for generating a different analog signal corresponds to applying a second one of the multiple power amplifiers to the different analog signal indicate a second value of the data type.

In Aspect 39, the method of any of Aspects 31 to 38 includes where the second data is of a data type, includes converting one or more additional symbols based on applying the non-linear function to indicate additional data of the data type.

In Aspect 40, the method of any of Aspects 31 to 39 includes transmitting, to a network node, an indication of a capability of the UE to apply one or more non-linear functions, where converting the symbol by applying the non-linear function is associated with transmitting the indication of the capability.

In Aspect 41, the method of Aspect 40 includes where the indication of the capability includes an indication of a number of non-linear functions supported by the UE.

In Aspect 42, the method of any of Aspects 31 to 41 includes where the non-linear function is one of multiple non-linear functions of applying multiple power amplifiers, includes transmitting, to the network node, a number of coefficients and corresponding values to be used in applying each of the multiple power amplifiers to use each of the multiple non-linear functions.

In Aspect 43, the method of any of Aspects 31 to 42 includes transmitting, to the network node, an expected MSE for each of multiple non-linear functions including the non-linear function.

In Aspect 44, the method of any of Aspects 31 to 43 includes transmitting, to the network node and prior to transmitting the analog signal, a reference signal corresponding to one or more non-linear functions including the non-linear function.

In Aspect 45, the method of Aspect 44 includes where transmitting the reference signal is based on a request received from the network node.

Aspect 46 is a method for wireless communication at a network node including receiving an analog signal from a UE, and estimating a non-linear function applied to the analog signal in converting a symbol indicating first data into the analog signal, where estimating the non-linear function provides an indication of second data, separate from first data.

In Aspect 47, the method of Aspect 46 includes where estimating the non-linear function includes selecting, based on testing multiple non-linear function hypotheses on the analog signal, one of the multiple non-linear functions as the non-linear function for indicating the second data.

In Aspect 48, the method of Aspect 47 includes hard slicing a number of the multiple hypotheses and calculating a signal-to-error ratio per hypothesis, where selecting the one of the multiple non-linear functions is based on the signal-to-error ratio.

In Aspect 49, the method of any of Aspects 46 to 48 includes where the second data includes HARQ feedback, where estimating the non-linear function indicates a first feedback value for the HARQ feedback, and further comprising retransmitting a downlink communication where the first feedback value is NACK.

In Aspect 50, the method of Aspect 49 includes where estimating a different non-linear function indicates a second feedback value for the HARQ feedback.

In Aspect 51, the method of any of Aspects 49 or 50 includes where the HARQ feedback includes an ACK or a NACK indicating whether or not a signal received in a certain beam and code block group for the downlink communication in a previous slot is successfully received.

In Aspect 52, the method of any of Aspects 49 to 51 includes scheduling the HARQ feedback that identifies at least the symbol for indicating HARQ feedback for a first beam and code block group in a first previous symbol in a previous slot by applying the non-linear function and a second symbol for indicating HARQ feedback for a second beam and code block group in a second previous symbol in the previous slot by applying the non-linear function.

In Aspect 53, the method of Aspect 52 includes scheduling additional HARQ feedback in an uplink control channel transmission.

In Aspect 54, the method of any of Aspects 46 to 53 includes where the second data is of a data type, includes estimating the non-linear function for one or more additional analog signals to indicate additional data of the data type.

In Aspect 55, the method of any of Aspects 46 to 54 includes receiving, from the UE, an indication of a capability of the UE to apply one or more non-linear functions, where estimating the non-linear function is associated with the indication of the capability.

In Aspect 56, the method of Aspect 55 includes where the indication of the capability includes an indication of a number of non-linear functions supported by the UE.

In Aspect 57, the method of any of Aspects 46 to 56 includes where the non-linear function is one of multiple non-linear functions of applying multiple power amplifiers, includes receiving, from the UE, a number of coefficients and corresponding values to be used in applying each of the multiple power amplifiers to use each of the multiple non-linear functions.

In Aspect 58, the method of any of Aspects 46 to 57 includes receiving, from the UE, an expected MSE for each of multiple non-linear functions including the non-linear function, where estimating the non-linear function is associated with the expected MSE.

In Aspect 59, the method of any of Aspects 46 to 58 includes receiving, from the UE and prior to receiving the analog signal, a reference signal corresponding to one or more non-linear functions including the non-linear function, where estimating the non-linear function is associated with a MSE of the reference signal.

In Aspect 60, the method of Aspect 59 includes where receiving the reference signal is based on a request transmitted by the network node.

Aspect 61 is an apparatus for wireless communication including means for performing any of the methods of Aspects 31 to 60.

Aspect 62 is a computer-readable medium including code executable by one or more processors for wireless communications, the code including code for performing any of the methods of Aspects 31 to 60.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
    a transceiver;
    a memory configured to store instructions; and
    one or more processors communicatively coupled with the memory and the transceiver, wherein the one or more processors are configured to execute the instructions to cause the apparatus to:
        select a non-linear function from multiple non-linear functions as one of a first non-linear function to indicate a first value for second data or a second non-linear function to indicate a second value for the second data, wherein the first non-linear function is different than the second non-linear function;
        convert, by applying the non-linear function, a symbol indicating first data into an analog signal for transmission to a network node, wherein applying the non-linear function to the symbol adds an indication of the first value or the second value of the second data, separate from the first data, in the analog signal; and
        transmit the analog signal to the network node.

2. The apparatus of claim 1, wherein the second data includes hybrid automatic repeat/request (HARQ) feedback.

3. The apparatus of claim 2, wherein the one or more processors are further configured to execute the instructions to cause the apparatus to determine whether to apply the first non-linear function to the symbol to indicate a first feedback value for the HARQ feedback or second non-linear function to indicate a second feedback value for the HARQ feedback, and the first feedback value is different than the second feedback value.

4. The apparatus of claim 2, wherein the HARQ feedback includes an acknowledgement (ACK) or a negative-ACK (HACK) indicating whether or not a signal received in a certain beam and code block group in a previous slot is successfully received.

5. The apparatus of claim 2, wherein the one or more processors are further configured to execute the instructions to cause the apparatus to receive a scheduling of the HARQ feedback that identifies at least the symbol for indicating HARQ feedback for a first beam and code block group in a first previous symbol in a previous slot by applying the non-linear function and a second symbol for indicating HARQ feedback for a second beam and code block group in a second previous symbol in the previous slot by applying the non-linear function.

6. The apparatus of claim 5, wherein the one or more processors are further configured to execute the instructions to cause the apparatus to receive a scheduling for additional HARQ feedback in an uplink control channel transmission.

7. The apparatus of claim 1, wherein the second data is of a data type, wherein the one or more processors are configured to execute the instructions to cause the apparatus to apply the non-linear function at least in part by applying one or more of multiple power amplifiers to the analog signal to indicate the first value of the data type for the second data, and wherein the one or more processors are configured to execute the instructions to cause the apparatus to apply a different non-linear function to a different symbol for generating a different analog signal at least in part by differently applying the one or more of the multiple power amplifiers to the different analog signal to indicate the second value of the data type.

8. The apparatus of claim 1, wherein the second data is of a data type, wherein the one or more processors are configured to execute the instructions to cause the apparatus to apply non-linear function at least in part by applying a first one of multiple power amplifiers to the analog signal to indicate the first value of the data type for the second data, and wherein the one or more processors are configured to execute the instructions to cause the apparatus to apply a different non-linear function to a different symbol for generating a different analog signal at least in part by applying a second one of the multiple power amplifiers to the different analog signal indicate the second value of the data type.

9. The apparatus of claim 1, wherein the second data is of a data type, wherein the one or more processors are further configured to execute the instructions to cause the apparatus to convert one or more additional symbols based on applying the non-linear function to indicate additional data of the data type.

10. The apparatus of claim 1, wherein the one or more processors are further configured to execute the instructions to cause the apparatus to transmit, to a network node, an indication of a capability of the apparatus to apply the multiple non-linear functions, wherein the one or more processors are configured to execute the instructions to cause the apparatus to convert the symbol by applying the non-linear function associated with transmitting the indication of the capability.

11. The apparatus of claim 10, wherein the indication of the capability includes an indication of a number of non-linear functions supported by the apparatus.

12. The apparatus of claim 1, wherein the non-linear function is one of the multiple non-linear functions of applying multiple power amplifiers, wherein the one or more processors are further configured to execute the instructions to cause the apparatus to transmit, to the network node, a number of coefficients and corresponding values to be used in applying each of the multiple power amplifiers to use each of the multiple non-linear functions.

13. The apparatus of claim 1, wherein the one or more processors are further configured to execute the instructions to cause the apparatus to transmit, to the network node, an expected means squared error (MSE) for each of the multiple non-linear functions including the non-linear function.

14. The apparatus of claim 1, wherein the one or more processors are further configured to execute the instructions to cause the apparatus to transmit, to the network node and prior to transmitting the analog signal, a reference signal corresponding to the multiple non-linear functions including the non-linear function.

15. The apparatus of claim 14, wherein transmitting the reference signal is based on a request received from the network node.

16. An apparatus for wireless communication, comprising:
a transceiver;
a memory configured to store instructions; and
one or more processors communicatively coupled with the memory and the transceiver, wherein the one or more processors are configured to execute the instructions to cause the apparatus to:
receive an analog signal from a user equipment (UE); and
estimate, in converting a symbol indicating first data into the analog signal, a non-linear function applied to the analog signal to be one of multiple non-linear functions used to indicate either a first value for second data or a second value of the second data, wherein estimating the non-linear function provides an indication of the first value or the second value for the second data, separate from first data.

17. The apparatus of claim 16, wherein the one or more processors are configured to execute the instructions to cause the apparatus to estimate the non-linear function at least in part by selecting, based on testing multiple non-linear function hypotheses on the analog signal, one of the multiple non-linear functions as the non-linear function for indicating the first value or the second value for the second data.

18. The apparatus of claim 17, wherein the one or more processors are further configured to execute the instructions to cause the apparatus to hard slice a number of the multiple hypotheses and calculating a signal-to-error ratio per hypothesis, wherein the one or more processors are configured to execute the instructions to cause the apparatus to select the one of the multiple non-linear functions is based on the signal-to-error ratio.

19. The apparatus of claim 16, wherein the second data includes hybrid automatic repeat/request (HARQ) feedback, wherein the one or more processors are configured to execute the instructions to cause the apparatus to estimate the non-linear function to indicate a first feedback value for the HARQ feedback, and wherein the one or more processors are further configured to execute the instructions to cause the apparatus to retransmit a downlink communication where the first feedback value is negative-acknowledgement (NACK).

20. The apparatus of claim 19, wherein the one or more processors are configured to execute the instructions to cause the apparatus to estimate a different non-linear function to indicate a second feedback value for the HARQ feedback.

21. The apparatus of claim 19, wherein the one or more processors are further configured to execute the instructions to cause the apparatus to schedule the HARQ feedback that identifies at least the symbol for indicating HARQ feedback for a first beam and code block group in a first previous symbol in a previous slot by applying the non-linear function and a second symbol for indicating HARQ feedback for a second beam and code block group in a second previous symbol in the previous slot by applying the non-linear function.

22. The apparatus of claim 21, wherein the one or more processors are further configured to execute the instructions to cause the apparatus to schedule additional HARQ feedback in an uplink control channel transmission.

23. The apparatus of claim 16, wherein the second data is of a data type, wherein the one or more processors are further configured to execute the instructions to cause the apparatus to estimate the non-linear function for one or more additional analog signals to indicate additional data of the data type.

24. The apparatus of claim 16, wherein the one or more processors are further configured to execute the instructions to cause the apparatus to receive, from the UE, an indication of a capability of the UE to apply one or more non-linear functions, wherein the one or more processors are configured to execute the instructions to cause the apparatus to estimate the non-linear function as associated with the indication of the capability.

25. The apparatus of claim 16, wherein the non-linear function is one of the multiple non-linear functions of applying multiple power amplifiers, wherein the one or more processors are further configured to execute the instructions to cause the apparatus to receive, from the UE, a number of coefficients and corresponding values to be used in applying each of the multiple power amplifiers to use each of the multiple non-linear functions.

26. The apparatus of claim 16, wherein the one or more processors are further configured to execute the instructions to cause the apparatus to receive, from the UE, an expected means squared error (MSE) for each of the multiple non-linear functions including the non-linear function, wherein the one or more processors are configured to execute the instructions to cause the apparatus to estimate the non-linear function as associated with the expected MSE.

27. A method for wireless communication at a user equipment (UE), comprising:
    selecting a non-linear function from multiple non-linear functions as one of a first non-linear function to indicate a first value for second data or a second non-linear function to indicate a second value for the second data, wherein the first non-linear function is different than the second non-linear function;
    converting, by applying the non-linear function, a symbol indicating first data into an analog signal for transmission to a network node, wherein applying the non-linear function to the symbol adds an indication of the first value or the second value of the second data, separate from the first data, in the analog signal; and
    transmitting the analog signal to the network node.

28. The method of claim 27, wherein the second data includes hybrid automatic repeat/request (HARQ) feedback.

29. A method for wireless communication at a network node, comprising:
    receiving an analog signal from a user equipment (UE); and
    estimating, in converting a symbol indicating first data into the analog signal, a non-linear function applied to the analog signal to be one of multiple non-linear functions used to indicate either a first value for second data or a second value of the second data, wherein estimating the non-linear function provides an indication of the first value or the second value for the second data, separate from first data.

30. The method of claim 29, wherein estimating the non-linear function includes selecting, based on testing multiple non-linear function hypotheses on the analog signal, one of the multiple non-linear functions as the non-linear function for indicating the first value or the second value for the second data.

* * * * *